United States Patent Office.

CARL GÜNTHER, OF BERLIN, PRUSSIA, ASSIGNOR TO FREDERICK VOLKMAN, OF SAME PLACE.

Letters Patent No. 99,773, dated February 15, 1870.

IMPROVED PROCESS AND MATERIAL FOR ORNAMENTING TEXTILE FABRICS.

The Schedule referred to in these Letters Patent and making part of the same.

*To all whom it may concern:*

Be it known that I, CARL GÜNTHER, of Berlin, province of Brandenburg, and Kingdom of Prussia, have invented a new and useful Improvement in the Process and Materials for Ornamenting Textile Fabrics; and I declare the following to be a full and exact description thereof, which will enable a person fairly skilled in the arts to which my invention appertains to make and use the same.

My invention consists in an entirely new process for gilding, silvering, or painting with colors on woven fabrics, and in the manufacture of new and peculiar varnishes used in such process.

The advantages of this process are:

First, it looks much better than the product of any present process.

Second, it leaves the cloth flexible.

Third, it will not peel off.

Fourth, it is not easily injured, even when exposed to all changes of the weather in the open air.

Fifth, when soiled it can be cleaned with soap and water.

In this process I make use of two principal varnishes, which I denominate, respectively, "yellow" and "white" varnishes.

Preparation of the Yellow Varnish.

Take unburnt yellow ochre, (gold ochre or French ochre,) most finely powdered, and add to it so much boiled oil as to form a stiff pulp. This is ground together in small quantities, adding enough spirits of turpentine to make it work freely in the mill. To one pound of this mixture add five ounces more of boiled oil and two ounces of the varnish used in making printers' ink, which last-mentioned varnish must be as thick as possible. Add four ounces copal varnish. All the ingredients are once more carefully mixed, and the mixture is then boiled down until it has acquired the consistency of thick tar. By this process of boiling, all ingredients are so perfectly combined with one another that they will not separate at all, even when diluted with spirits of turpentine preparatory to using, which is done with both varnishes.

Preparation of the White Varnish.

This is prepared in the same way as the yellow varnish, only substituting white lead for the ochre.

The following prescriptions for preparing boiled oil and copal varnish are best adapted for use herein:

Boiled Oil.

Thirty parts linseed-oil are boiled for two hours, with the addition of a few crusts of old bread and some crushed onions, which suck up all impurities. Add three and one-third parts of white vitriol, previously calcinated, and rubbed together with a little spirits of turpentine. Stir diligently, and add, after half an hour, two parts of litharge, which, also, is previously mixed with spirits of turpentine. Boil for two hours longer, and strain.

Copal Varnish.

Take thirty pounds gum copal, melt, and add seven pounds of boiled oil, prepared as described. In ten minutes add, gradually, forty-five pounds of spirits of turpentine, in a lukewarm state. Strain. Should the varnish be too thick, add not to exceed fifteen pounds of turpentine.

Gilding of Fabrics.

Apply, first, a coat of white varnish. Let it dry completely, and give a coat of yellow varnish. This may be done with a brush or by a process of printing. After twenty-four hours the varnish will be nearly dry. Now begin to apply gold-leaf, dividing it on a leathern cushion as required, taking it up from the cushion, and placing it gently on the cloth. The gold will instantly adhere. It is then pressed down with a ball of soft cotton. After a few minutes the gentle application of a large, soft brush will sweep away all the loose particles of the leaf, without disturbing the rest. The process is finished by drying at a temperature not to exceed 155° Fahrenheit.

Silvering and Platinizing of Fabrics.

This is accomplished in the same way as gilding, except that yellow varnish is taken for the first coat, and white varnish for the last, and, of course, silver or platina-leaf is used instead of gold-leaf.

I do not intend herein to confine myself to the application of metals in the leaf only, for it is quite as practicable to use the metals in the form of a powder, and it is intended herein to cover the use of the powder, as well as the leaf, in the process herein described.

It is at once obvious that almost any of the metals may be applied by this process. If cheap, coarse metals are used, the coatings of varnish must be made a little thicker than otherwise.

By mixing the yellow and white varnishes the effect can be varied. In what proportions this has to be done depends entirely upon what qualities are most desired in the product. Yellow varnish leaves the cloth as flexible as it was before, and imparts a very fine, mild lustre to the metal, while white varnish gives a much more brilliant lustre, but tends to make the fabric comparatively stiff. Bearing these items in mind, the operator will have no difficulty in deciding whether to combine and how to combine in any particular case. In most cases the addition of a little yellow varnish to the white has a good effect, as it makes the whole dry more slowly.

Oil colors can be used over these varnishes if desired, and that with great advantage. The colors can also be laid on over the metals. In order to keep such colors fresh and bright, the cloth is dried at a temperature not higher than 75° Fahrenheit, and is then coated as thinly as possible, with a French varnish known as *Nouveau Vernis à tableaux No. 3.* The gilded and silvered places must, of course, be kept free from this varnish.

I expressly disclaim the application of any process for ornamenting rubber cloth, as is done by J. F. Burgess, in Letters Patent No. 59,959, dated November 27, 1866, as I use no composition known to him, and apply my process to textile fabrics, which he does not; but

I claim, as my invention—

The yellow and the white varnishes, made of the ingredients described or their equivalents, in the manner and for the purposes set forth.

Also, the process described of ornamenting textile fabrics by the application of said varnishes, together with metals or colors or both, in the manner set forth.

Also, as a new article of manufacture, textile fabrics ornamented as described, by the processes set forth.

CARL GÜNTHER.

Witnesses:
H. KREISMANN,
CONSTANT SCHWARZ.